B. ROBERTS.
COMBINED SAW SET AND GAGE.
APPLICATION FILED MAR. 23, 1910.

985,706.

Patented Feb. 28, 1911.

Witnesses
Wm. J. Jordan.
Rita Hall.

Inventor
Ben Roberts
by Hector R. Cease
Atty.

UNITED STATES PATENT OFFICE.

BENJAMIN ROBERTS, OF WESTBANK, BRITISH COLUMBIA, CANADA.

COMBINED SAW SET AND GAGE.

985,706.  Specification of Letters Patent.  Patented Feb. 28, 1911.

Application filed March 23, 1910. Serial No. 551,222.

*To all whom it may concern:*

Be it known that I, BENJAMIN ROBERTS, a subject of the King of Great Britain, residing in the village of Westbank, in the Province of British Columbia, Canada, have invented certain new and useful Improvements in Combined Saw Sets and Gages, of which the following is a specification.

My invention relates to improvements in combined saw-sets and gages, and relates more particularly to a combined saw-set and gage made in the form of a hand tool, and the object of my invention is to provide a cheaply constructed, yet efficient tool of the class described whereby the teeth of the saw can be positively given the same set, and which tool can be adjusted in order to vary or change the degree of set of the teeth, and the construction of my invention will be hereinafter more particularly described, and the parts I claim as new will be pointed out in the claims forming part of this specification.

Figures 1, 2:
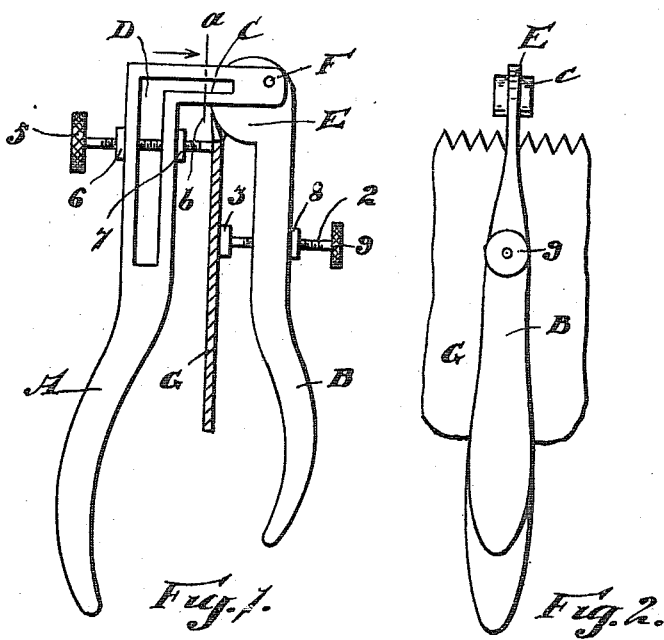
Figures 3, 4:
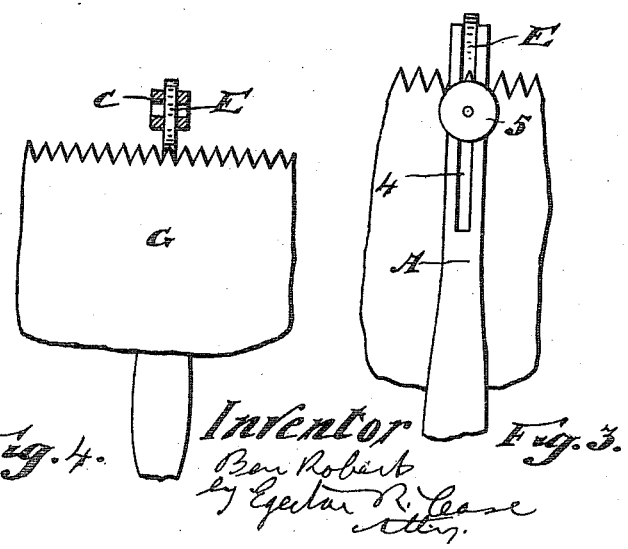

Figure 1 is a side elevation of my tool, showing the same positioned on a saw-blade, which is shown in section. Figs. 2 and 3 are end elevations of my tool, and Fig. 4 is a vertical section on the line $a-b$, Fig. 1.

In the drawings, like characters of reference indicate corresponding parts in each figure.

A and B are levers which form the handles of the tool. The lever A is provided with an off-set portion C, which off-set portion is, and also the upper portion of the lever A, slotted as shown at D so as to lighten the tool. The lever B is provided with a disk-shaped head E, made of the proper thickness, and the same is eccentrically pivoted in the outer end of the off-set portion C by means of the pin F. The levers of the tool are positioned on each side of the saw-blade G (which saw-blade is held in any suitable support not shown) as shown in Fig. 1. Threaded through the lever B is a gage-screw 2, preferably provided with the enlarged end 3 which is designed to contact with the saw-blade G.

4 is a longitudinal slot formed in the upper portion of the lever A, and adjustably held in this slot is a set-screw 5. 6 and 7 are nuts threaded on the said set-screw, and designed to be screwed respectively, against the outer and inner edges of the upper portion of the lever A, in order to hold the said set-screw in its adjusted position. By slackening either of the nuts 6 and 7, the set-screw 5 may be moved in the longitudinal slot 4, and by tightening up the slackened nut, the said set-screw will be held in its adjusted position.

As will be seen on referring to Fig. 4, the disk-shaped head E is substantially as thick as a tooth is wide, and by means of the eccentric mounting of the lever B in the lever A, the disk-shaped head E will be forced against the desired tooth and will bend it outward until the end 3 of the gage-screw 2 abuts against the saw-blade G.

If desired, a nut 8 may be mounted on the gage-screw 2 between its head 9 and the lever B, so as to provide means for positively locking the gage-screw 2 in adjusted position.

The set-screw 5 can be adjusted in the longitudinal slot 4 so that the inner end of the said set-screw will be positioned to contact with any point on a tooth midway its apex and root. By slackening one of the nuts 6 and 7 and tightening up the other nut, the set-screw 5 can be moved toward or away from the lever B, so that the teeth of the saw will be given the desired set. When the set-screw 5 is being adjusted, the gage-screw 2 must also be adjusted so as to allow for the proper positioning of the saw-blade when the tool is placed thereover. By means of the gage-screw 2 it will be of course understood that my tool may be adjusted for use in connection with saw-blades of various thickness.

I do not confine myself to the construction herein shown and described, except in so far as may be rendered necessary by the prior state of the art, and the terms of my claims.

What I claim as my invention is—

1. As a new article of manufacture, a combined saw-set and gage comprising a first handle longitudinally slotted and integrally provided at its outer end with an off-set portion; a screw adjustably mounted in said longitudinal slot so that it may be positioned to contact with any point of a tooth midway its apex and root and provided with a set-nut on each side of the handle; a second handle provided with a disk-shaped head eccentrically mounted in the end of the off-set portion of said first-mentioned handle; a pin passing through said head and through said off-set portion, and a gage screw adjustably mounted in the said second-mentioned handle.

2. As a new article of manufacture, a combined saw-set and gage comprising a first handle integrally provided at its outer end with an off-set portion; a screw carried by said handle and adjustable longitudinally and transversely thereof; means whereby said set-screw is held in its adjusted position on said handle; a second handle provided with a disk-shaped head eccentrically mounted in the end of the off-set portion of said first-mentioned handle; a pin passing through said head and through said off-set portion, and a gage screw adjustably mounted in the said second-mentioned handle.

In testimony whereof I have affixed my signature in presence of two witnesses.

BEN. ROBERTS.

Witnesses:
  JOHN F. BURNE,
  J. I. LAVIGNE.

---

Copies of this patent may be obtained for five cents each, by addressing the "Commissioner of Patents, Washington, D. C."